US006687807B1

(12) United States Patent
Damron

(10) Patent No.: US 6,687,807 B1
(45) Date of Patent: Feb. 3, 2004

(54) METHOD FOR APPARATUS FOR PREFETCHING LINKED DATA STRUCTURES

(75) Inventor: Peter C. Damron, Fremont, CA (US)

(73) Assignee: Sun Microystems, Inc., Santa Clara, CA (US)

( * ) Notice: Subject to any disclaimer, the term of this patent is extended or adjusted under 35 U.S.C. 154(b) by 0 days.

(21) Appl. No.: 09/551,292

(22) Filed: Apr. 18, 2000

(51) Int. Cl.$^7$ .................................................. G06F 9/00
(52) U.S. Cl. ........................ 712/205; 712/207; 711/137
(58) Field of Search ................................ 711/137, 108, 711/212, 213; 712/202, 207, 205, 206

(56) References Cited

U.S. PATENT DOCUMENTS

| | | | | |
|---|---|---|---|---|
| 5,107,418 A | | 4/1992 | Cramer et al. ............... | 395/700 |
| 5,185,810 A | | 2/1993 | Freischlad ...................... | 382/8 |
| 5,317,713 A | * | 5/1994 | Jouppi ......................... | 711/113 |
| 5,317,740 A | | 5/1994 | Sites ........................... | 395/700 |
| 5,659,754 A | | 8/1997 | Grove et al. ................. | 395/709 |
| 5,694,568 A | * | 12/1997 | Harrison et al. ............ | 711/213 |
| 5,761,468 A | * | 6/1998 | Emberson .................... | 712/207 |
| 5,778,233 A | | 7/1998 | Besaw et al. ................ | 395/709 |
| 5,790,859 A | | 8/1998 | Sarkar ......................... | 395/704 |
| 5,822,788 A | | 10/1998 | Kahn et al. .................. | 711/213 |
| 5,905,876 A | | 5/1999 | Pawlowski et al. ......... | 395/292 |
| 5,948,095 A | | 9/1999 | Arora et al. ................. | 712/200 |
| 5,996,061 A | * | 11/1999 | Lopez-Aguado et al. ... | 712/207 |
| 6,119,218 A | | 9/2000 | Arora et al. ................. | 712/207 |
| 6,175,898 B1 | * | 1/2001 | Ahmed et al. .............. | 711/137 |
| 6,253,306 B1 | | 6/2001 | Ben-Meir et al. ........... | 712/207 |
| 6,317,810 B1 | * | 11/2001 | Lopez-Aguado et al. ... | 711/120 |
| 6,418,516 B1 | * | 7/2002 | Arimilli et al. ............. | 711/138 |

OTHER PUBLICATIONS

Stallings, William, "Operating Systems", 3$^{rd}$ edition, 1998, Prentice–Hall, Upper Saddle River, New Jersey, pp. 325–327.*

Doug Joseph et al., "Prefetching using Markov Predictors", Jun. 1997.

Chi–Keung Luk et al., "Compiler–Based Prefetching for Recursive Data Structures", Oct. 1996, pp. 222–233.

International Preliminary Examination Report, PCT/US01/41511, filed Aug. 1, 2001.

* cited by examiner

Primary Examiner—Henry W. H. Tsai
(74) Attorney, Agent, or Firm—Thelen Reid & Priest, LLP; David B. Ritchie

(57) ABSTRACT

Additional memory hardware in a computer system which is distinct in function from the main memory system architecture permits the storage and retrieval of prefetch addresses and allows the compiler to more efficiently generate prefetch instructions for execution while traversing pointer-based or recursive data structures. The additional memory hardware makes up a content addressable memory (CAM) or a hash table/array memory that is relatively close in cycle time to the CPU and relatively small when compared to the main memory system. The additional CAM hardware permits the compiler to write data access loops which remember the addresses for each node visited while traversing the linked data structure by providing storage space to hold a prefetch address or a set of prefetch addresses. Since the additional CAM is separate from the main memory system and acts as an alternate cache for holding the prefetch addresses, it prevents the overwriting of desired information in the regular cache and thus leaves the regular cache unpolluted. Furthermore, rather than having the addresses for the entire memory system stored in the CAM, only the addresses to those data nodes traversed along the pointer-based data structure are stored and thus remembered, which allows the size of the CAM to remain relatively small and access to the CAM by the CPU, relatively fast.

32 Claims, 5 Drawing Sheets

| $A_1$ | $N_1$ |
|---|---|
| $A_2$ | $N_2$ |
| $A_3$ | $N_3$ |
| $A_4$ | $N_4$ |
| $A_5$ | $N_5$ |
| $A_6$ | $N_6$ |
| $A_7$ | $N_7$ |
| $A_8$ | $N_8$ |
| $A_9$ | $N_9$ |

METHOD FOR APPARATUS FOR PREFETCHING LINKED DATA STRUCTURES

BACKGROUND OF THE INVENTION

1. Field of the Invention

The present invention is generally directed to reducing the latency of memory operations in modern computer systems. More specifically, the present invention is directed to additional computer system hardware and a method for more efficient generation of prefetch instructions in compiler-inserted prefetching of pointer-based or recursive data structures.

2. Background

Processor utilization in modem computer systems is diminished by latency of memory accesses. Memory speeds have not kept pace with continually increasing processor speeds, and the widening gap between the two makes it difficult to realize high processor efficiencies.

Most computer systems use a cache hierarchy to help alleviate the problem of memory latency. As illustrated for example in FIG. 1, different levels of cache memory 104, 106 are located closer to the central processing unit (CPU) 100 than the main memory 102. Other cache structures such as separate instruction, data and prefetch caches are also known in the art. Cache memory is a short term memory which typically contains data most likely to be accessed by the CPU 100. Therefore, fewer data requests from the CPU 100 result in data accesses that extend all the way out to the main memory 102, and there is a reduction in the amount of cycle time that the CPU 100 sits idly waiting for the data it requests. A typical first level cache 104 as shown in FIG. 1 may be only 2 to 3 cycles away from the core of the CPU 100 while a second level cache 106 may be 10 to 20 cycles away. However, main memory 102 may be on the order of 100 to 500 cycles away from the core of the CPU 100 which can result in significant latency for a CPU 100 which is required to access the main memory 102 on a frequent basis.

A typical program working on a linked data structure directed to the computer's memory subsystem and executed on the CPU 100 might include a process such as that demonstrated by the flow chart of FIG. 2. The process searches through the memory subsystem one data node at a time until the desired data is located, at which point the search would stop and the data would be used by the CPU 100 for further processing. The first step of the process 200 determines whether the end of the data structure has been reached by checking the node address against null. If the node address is equal to null and thus not valid, the process might move on to another data structure 202 within the memory subsystem and continue the search. If the node address is not equal to null, the data at that address is fetched 210 and is checked against a key value 204 to determine whether it is the desired data. If the data is the desired data, the search stops and the data is further processed 206 by the CPU 100. If the data is not the desired data, the search continues on at the next data node 208 within the data structure.

Significant latency can occur if the CPU 100 sits idly waiting for data requests to be answered by the memory subsystem 102, 104, 106. Although cache memory is useful in mitigating the memory latency problem, it is not a complete solution. Other techniques have been developed to address the increasing divergence between processor speeds and memory speeds. Automatic compiler techniques such as software-controlled prefetching have had moderate success. Software-controlled prefetching is a compiler technique for tolerating memory latency by executing data prefetch instructions which move data into the cache and closer to the processor before it is needed by the processor. Although software-controlled prefetching offers some benefit to the memory latency problem, it suffers from several disadvantages such as the need for a sophisticated compiler to insert prefetch instructions into the code, execution overhead created by the new prefetch instructions, and its mostly limited application to array-based data structures.

Along with multi-dimensional data array structures, pointer-based or recursive data structures which include linked lists, trees and graphs are one of the most common methods of building large data structures. As illustrated in FIG. 3A, each node 300 within a recursive data structure has a field which contains a pointer address 302 pointing to the address 304 of the next node in the data structure. By contrast, in a data array structure as shown for example in FIG. 3B, consecutive data elements or nodes 306 are located at contiguous addresses 308. Therefore, predicting which data nodes in the memory that need to be prefetched due to the likelihood of generating a cache miss and inserting a prefetch instruction sufficiently far in advance to avoid memory latency is significantly more difficult in a recursive data structure than in a data array structure. This is so because addresses to consecutive data elements or nodes in data array memory structures can always be calculated given a reference point address, while the lack of spatial locality due to the arbitrary addressing of data nodes in a recursive data structure precludes the discovery of the next desired node address until the address value stored in that particular node is actually read. Thus, the limitation of software-controlled prefetching to mostly multi-dimensional data array structures is apparent based on the problems encountered in software-controlled prefetching of recursive data structures through compiler-inserted prefetching schemes.

Accordingly, there exists a need for a method of efficiently generating prefetch instructions in compiler-inserted prefetching of pointer-based or recursive data structures which incurs minimal costs in overhead and hardware.

SUMMARY OF THE INVENTION

Additional memory hardware in a computer system which is distinct in function from the main memory system architecture permits the storage and retrieval of prefetch addresses and allows the compiler to more efficiently generate prefetch instructions for execution while traversing pointer-based or recursive data structures. The additional memory hardware makes up a content addressable memory (CAM) or a hash table/array memory that is relatively close in cycle time to a processor such as a central processing unit (CPU) and relatively small when compared to the main memory system. The additional CAM hardware permits the compiler to write data access loops which remember the addresses for each node visited while traversing the linked data structure by providing storage space to hold a prefetch address or a set of prefetch addresses. Since the additional CAM is separate from the main memory system and acts as an alternate cache for holding the prefetch addresses, it prevents the overwriting of desired information in the regular cache and thus leaves the regular cache unpolluted. Furthermore, rather than having the addresses for the entire memory system stored in the CAM, only the addresses to those data nodes traversed along the pointer-based data structure are stored and thus remembered, which allows the size of the CAM to remain relatively small and access to the CAM by the CPU, relatively fast.

DETAILED DESCRIPTION OF THE INVENTION

Those of ordinary skill in the art will realize that the following description of the present invention is illustrative only and not in any way limiting. Other embodiments of the invention will readily suggest themselves to such skilled persons having the benefit of this disclosure.

Figure 3A:
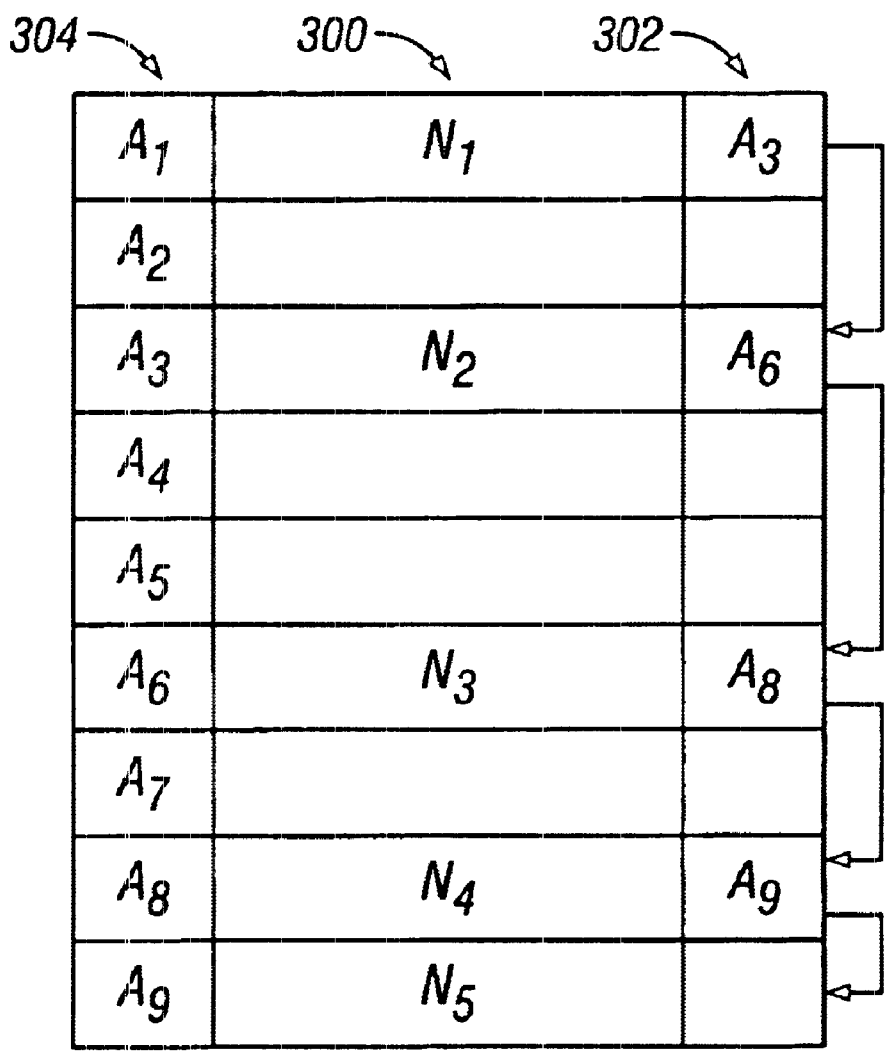
FIG. 3A is a diagram of a pointer-based or recursive data structure in the memory subsystem of a modern computer illustrating pointer fields containing addresses pointing to the next data node in the structure.
Figures 3B, 4A:
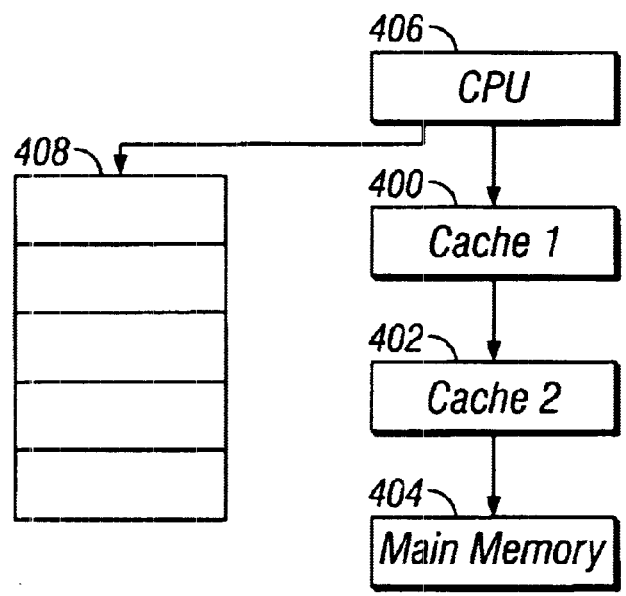
FIG. 3B is a diagram of a data array structure in the memory subsystem of a modern computer illustrating the contiguous addresses of consecutive data elements.
FIG. 4A is a diagram of a modern computer system illustrating the location of different levels of cache memory, main memory and separate memory hardware with respect to the central processing unit in accordance with a specific embodiment of the present invention.
Figure 4B:
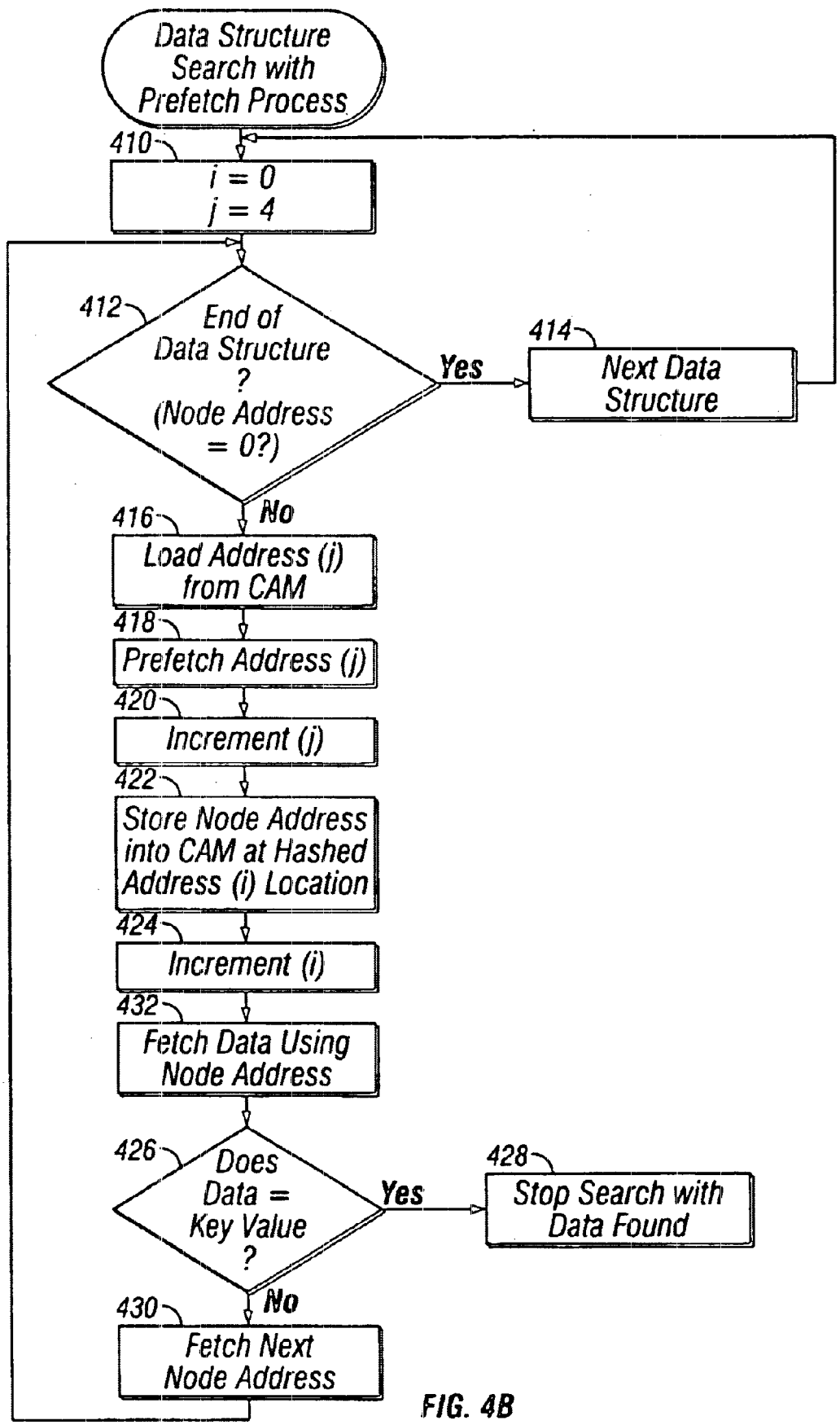
FIG. 4B is a flow chart illustrating a compiler-initiated process for prefetching data from the memory subsystem of a computer system utilizing the separate memory hardware of FIG. 4A while searching for data in a pointer-based data structure by the central processing unit in accordance with a specific embodiment of the present invention.

A specific embodiment of the present invention is illustrated by the computer hardware system as shown in FIG. 4A accompanied by the compiler-initiated prefetch process illustrated by the flow chart of FIG. 4B. Referring first to FIG. 4A, a computer system which preferably employs the use of two levels of cache memory 400, 402 in a cache hierarchy to bring data from the main memory 404 closer to a processor such as a central processing unit (CPU) 406 and thereby reduce memory latency, additionally employs the use of a separate memory hardware 408 which is functionally distinct from the main memory 404 and cache memory 400, 402 systems. In addition to being functionally distinct from the main memory 404 and cache memory 400, 402 systems, the separate memory hardware 408 may also be physically distinct as illustrated in FIG. 4A. The separate memory hardware 408 preferably makes up a content addressable memory (CAM) but can also be a hash table memory. As illustrated in FIG. 4A, the two levels of cache memory 400, 402 are located closer to the CPU 406 than the main memory 404, as is the additional CAM hardware 408. One skilled in the art will realize that the cache structure 400, 402 illustrated in FIG. 4A is used as an example of a cache structure and that other memory structures such as separate instruction, data, and prefetch caches could be used in its place. The first level cache memory 400 is typically between 2 to 3 cycles away from the CPU 406 while the second level cache memory 402 is about 10 to 20 cycles from the CPU 406. The main memory 404 is the farthest out from the CPU 406 and typically ranges from 100 to 500 cycles away. The CAM hardware 408 is typically between 2 and 10 cycles away from the CPU 406 and is thus quickly accessible by the CPU 406 relative to main memory 404.

Figure 2:
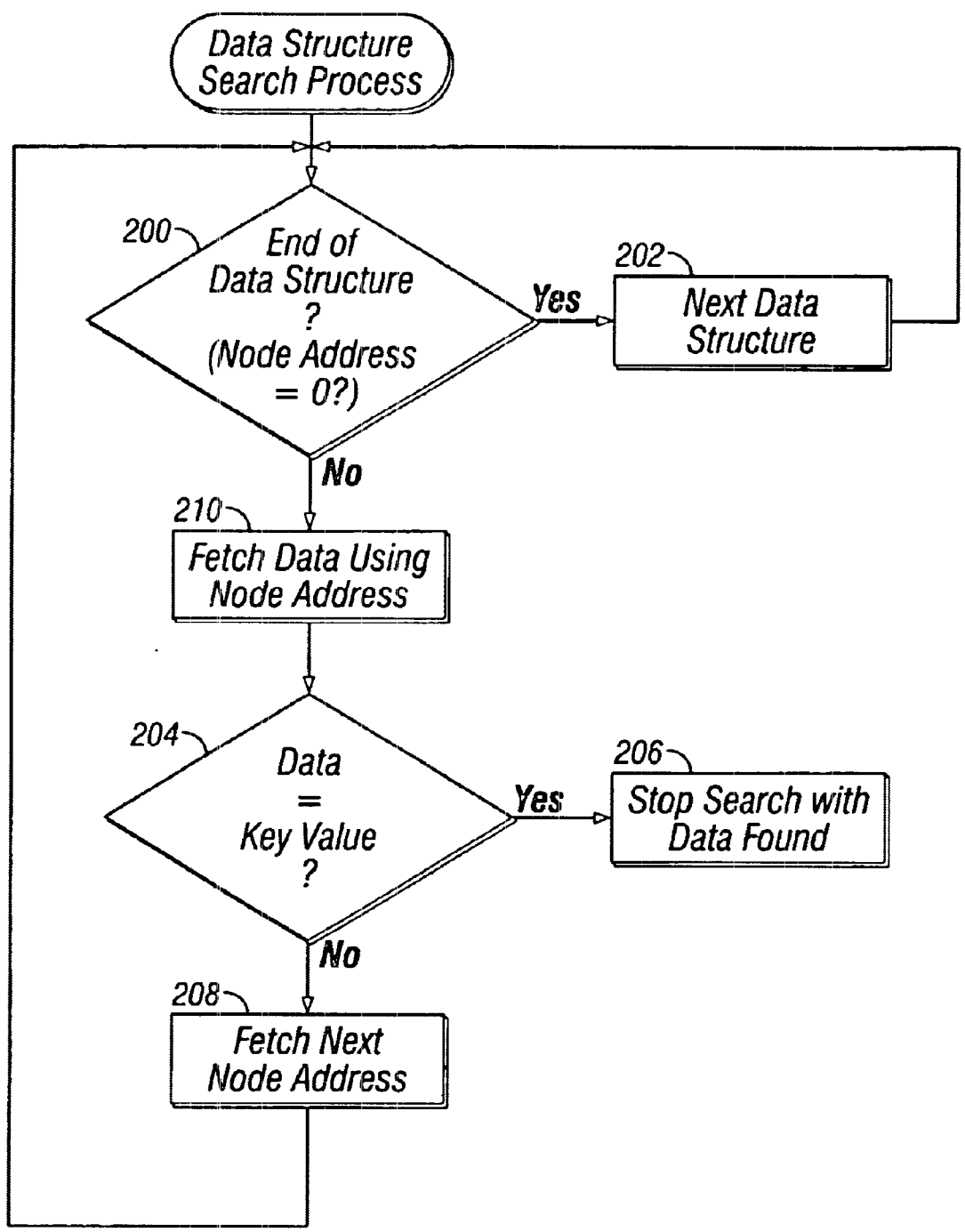
FIG. 2 is a flow chart illustrating a typical process for searching for data in a pointer-based or recursive data structure by the central processing unit of a modem computer system.

Use of the additional CAM 408 is initiated by a compiler program which is written to determine whether a particular data request process such as that illustrated by the flow chart of FIG. 2 should incorporate data prefetching. While compiling program source code, if the compiler program determines that a particular data structure access or search should be prefetched, it inserts special prefetch instructions into the normal code which is running the normal data structure search process such as that illustrated in FIG. 2. The compiler-inserted prefetch instructions control the use of the additional CAM 408 to provide a way of remembering which data needs prefetching. Prefetch addresses stored in the CAM 408 are used by the CPU 406 to query the memory system at all levels including all levels of cache memory 400, 402 and the main memory 404. If the desired prefetch data is not located in the cache memory 400, 402, the special prefetch instructions begin the process of bringing the data from main memory 404 into the cache memory 400, 402.

A normal data structure search process such as that illustrated in FIG. 2 is thus modified by a compiler program to control the use of the additional CAM 408 and produce a data structure search with prefetch process such as that shown in a specific embodiment of the present invention illustrated by the flow chart of FIG. 4B. The data structure search with prefetch process of FIG. 4B illustrates only one example of a prefetch process which could be implemented using the benefit of the additional CAM 408 described in the present invention. Other prefetch processes will be apparent to those skilled in the art having the benefit of the information in this application.

Referring to the flow chart of FIG. 4B, the first step 410 of the data structure search with prefetch process sets a counter "i" equal to zero. This counter represents the current data node being visited while traversing the recurrent data structure in search for data requested by the CPU 406. A counter "j" is also set to a value representing the distance by which the search will prefetch ahead. In the example of FIG. 4B, "j" is set equal to 4, indicating that the data search process will include prefetching data from data nodes which are 4 nodes ahead of the current node being visited. This process hopefully ensures that the correct data already exists in cache memory by the time the address to the node containing that data is visited, thus avoiding the need to travel out to main memory to obtain that data while the CPU remains idly waiting. One skilled in the art will realize that other methods of addressing the CAM 408 are also available, such as using the node address itself or the list address plus a counter. The next step of the process 412 determines whether the end of the data structure has been reached by checking the current node address against null. If the node address is equal to null and thus not valid, the process might move on to another data structure 414 within the memory subsystem and continue the search. If the node address is not equal to null, the CPU 406 loads the address to be prefetched 416 from the CAM 408, which in this example is 4 addresses ahead of the current node being visited. The first time through the process loop, there will not be a valid prefetch address in the CAM 408 since nothing will have been stored there yet. The value loaded the first time through the loop therefore is a predicted value for the address of the prefetch node. The next step 418 in the process prefetches data at the prefetch node address and brings it into the cache memory 400, 402. It will be apparent to those skilled in the art that the steps of loading the prefetch address 416 and prefetching that address 418 may be performed in a single step by a single code instruction or in multiple steps by multiple code instructions. The counter "j", representing the distance by which the search will prefetch ahead, is then incremented 420. The prefetch address that is the current node address is then stored 422 into the CAM 408 at a location determined by the counter "i" or by some other hashing of the address for a previous node visited in the search so that it can be accessed on the next traversal through the loop or the next time this code sequence is executed. The purpose of storing back the prefetch address is to enable the prefetching of the data at that address into cache memory while visiting a preceding node during the next data search. The current node counter "i" is then incremented 424 and the data from the node currently being visited is fetched 432 and is checked against a key value 426 to determine whether it is the desired data. If the data is the desired data, the search stops and the data is further processed 428 by the CPU 406. If the data is not the desired data, the search continues on at the next node address 430 within the data structure. One skilled in the art will note that the technique of the present invention can be used for straight line code sequences as well as for code loops.

Figure 1:
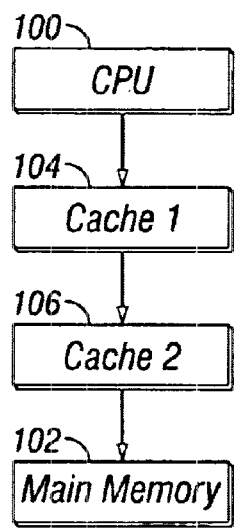
FIG. 1 is a diagram of a typical modern computer system illustrating the location of different levels of cache memory and main memory with respect to the central processing unit.
Figure 5:
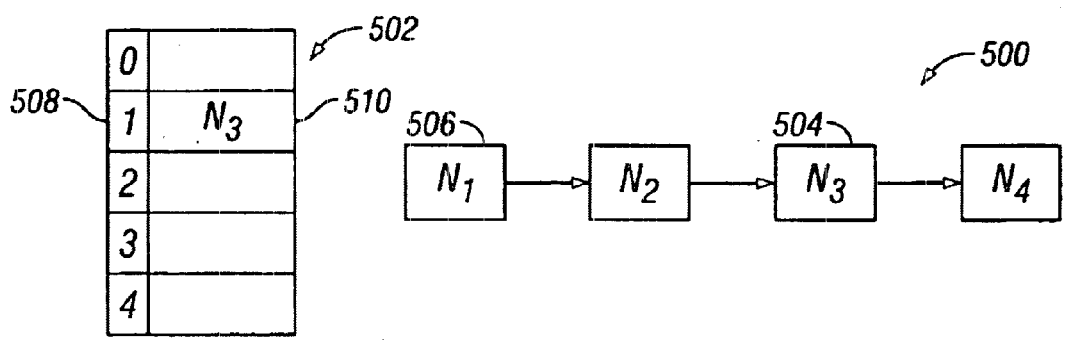
FIG. 5 is a diagram of data nodes within a recursive data structure and the separate memory hardware illustrated in FIG. 4A showing the process of storing prefetch addresses into the separate memory hardware in accordance with a specific embodiment of the present invention.

Another explanation of the process of FIG. 4B is illustrated by the recurrent data structure 500 and CAM or hash table 502 diagramed in FIG. 5. The objective is to prefetch some number of data nodes ahead of the data node currently being visited. In the example of FIG. 5, the number of data nodes to be prefetched ahead is two. Therefore, while visiting data node N3 504, the address for node N1 506 is hashed in a hash function to locate a storage register or index 508 within the CAM 502. This index location 508, provided by hashing the address of the node N1 506 visited two nodes ago, is where the address to the current node being visited, N3 504, is stored. While traversing the data structure or loop the next time through and visiting data node N1 506, the address of node N1 506 is then hashed and the look up in the CAM 502 reveals the address value for node N3 510. The data at node N3 504 is then prefetched into the cache memory where it will hopefully remain until it is needed by the CPU.

Although it will be apparent to one skilled in the art that the purpose of the present invention can be accomplished in some manner by using software alone and a hash table, the separate memory hardware or CAM 408 provides significant advantages including saving instructions that would be necessary for hashing the counter at node addresses, avoiding displacing data out of the cache since the CAM 408 is a memory which is separate from the regular cache/memory system, avoiding the possibility of introducing an additional cache miss during the load of the prefetch address 416, and saving the possible latency for loading the prefetch address 416 where a single instruction is used to both load the prefetch address 416 and accomplish the prefetch 418.

Alternative Embodiments

While embodiments and applications of this invention have been shown and described, it would be apparent to those skilled in the art having the benefit of this application that many more modifications than mentioned above are possible without departing from the inventive concepts herein. The invention, therefore, is not to be restricted except in the spirit of the appended claims.

What is claimed is:

1. An apparatus for prefetching data from a linked data structure in a computer system, comprising:
    a processor for executing instructions;
    at least one cache memory coupled to said processor, said cache memory holding data to be used by said processor; and
    a content addressable memory coupled to said processor, said content addressable memory holding at least one prefetch address, the prefetch address pointing to a data node in the linked data structure,
    said processor executing one or more special prefetching instructions to prefetch data onto said cache memory using the prefetch address retrieved from said content addressable memory.

2. The apparatus in accordance with claim 1, wherein the cache memory is closer to the processor in cycle time than the main memory.

3. The apparatus in accordance with claim 1, wherein the prefetch address pointing to a current data node is stored in said content addressable memory at a location determined by hashing an address of a prior data node previously visited by said processor.

4. The apparatus in accordance with claim 1, wherein the prefetch address for a current data node is stored in said content addressable memory at a location determined by an index indicating a prior data node previously visited by said processor.

5. The apparatus in accordance with claim 1, wherein the prefetch address for a current data node is stored in said content addressable memory at a location determined by a counter value indicating a prior data node previously visited by said processor.

6. The apparatus in accordance with claim 1, wherein said content addressable memory is a hash table memory.

7. The apparatus in accordance with claim 1, wherein the one or more special prefetching instructions are inserted by a compiler program which determines when the special prefetching instructions are to be inserted into normal cache searching program code.

8. The apparatus in accordance with claim 1, wherein said content addressable memory includes hardware which is distinct in function from said cache memory.

9. A method for prefetching data from a linked data structure in a computer system, said method comprising:
    traversing the linked data structure and visiting a first data node therein in search of requested data during execution of a process;
    locating, in a content addressable memory, a storage location associated with a second data node in the linked data structure which was visited prior to the first data node; and
    storing at the storage location associated with the second data node a data node address of the first data node as a prefetch address for the first data node.

10. The method as recited in claim 9, wherein the computer system includes a processor, at least one cache memory, and a main memory.

11. The method in accordance with claim 10, wherein the cache memory is closer to the processor in cycle time than the main memory.

12. The method in accordance with claim 9, further comprising:
    fetching data at the first data node onto a cache memory of the computer system.

13. The method in accordance with claim 12, further comprising:

checking the fetched data against a key value to determine if the fetched data is the requested data.

14. The method in accordance with claim 13, further comprising:
repeating said traversing, said locating, said storing, and said checking until the requested data is obtained.

15. The method in accordance with claim 14, wherein said retrieving and said prefetching are performed in a single execution step.

16. The method in accordance with claim 14, further comprising:
inserting special prefetching instructions for a selected data request process using a source code compiler program.

17. The method in accordance with claim 9, wherein said content addressable memory is a hash table memory.

18. The method in accordance with claim 9, further comprising:
traversing the linked data structure in search of requested data during next execution of the process;
retrieving, from the content addressable memory, a prefetch address for a current data node currently being visited by the process; and
prefetching data at the prefetch address of the linked data structure, the prefetch address pointing to a next data node to be visited by the process.

19. The method in accordance with claim 18, wherein said retrieving includes:
locating, in the content addressable memory, a storage location of the prefetch address for the current node by hashing the data node address of the current data node.

20. A method for prefetching data from a linked data structure within a memory subsystem of a computer system while searching for requested data in the linked data structure, said method comprising:
retrieving a prefetch address from a content addressable memory, the prefetch address pointing to a latter data node in the linked data structure, the latter data node being a specified number of data nodes beyond a current data node in the linked data structure;
prefetching data from the latter data node onto a cache memory of the memory subsystem;
storing an address of the current data node into the content addressable memory at a storage location associated with a data node which is the specified number of data nodes prior to the current data node within the linked data structure;
incrementing the latter data node to a next latter data node and incrementing the current data node to a next current data node;
fetching data from a data node being currently visited;
determining if the fetched data matches the requested data; and
iterating said retrieving, said prefetching, said storing, said incrementing, said fetching, and said determining until the fetched data matches the requested data.

21. The method in accordance with claim 20, wherein the storage location is determined by an index of the data node which is the specified number of data nodes prior to the current data node.

22. The method in accordance with claim 20, wherein the storage location is determined by a counter indicating the data node which is the specified number of data nodes prior to the current data node.

23. The method in accordance with claim 20, further comprising:
inserting special prefetching instructions for a selected data request process in source code, using a source code compiler program.

24. The method in accordance with claim 20, wherein the computer system includes a processor, at least on cache memory, and a main memory.

25. The method in accordance with claim 24, wherein the prefetch address points to a location in the main memory which is predicted to contain the requested data.

26. The method in accordance with claim 24, wherein the cache memory is closer to the processor in cycle time than the main memory.

27. The method in accordance with claim 20, wherein the content addressable memory is a hash table memory.

28. The method in accordance with claim 20, wherein the content addressable memory includes hardware which is distinct in function from the cache memory.

29. The method in accordance with claim 20, wherein said determining includes:
checking the fetched data against a key value.

30. The method in accordance with claim 20, wherein the storage location is determined by hashing the address of the data node the specified number of data nodes prior to the current data node.

31. A program storage device readable by a machine, tangibly embodying a program of instructions executable by the machine to perform a method for prefetching data from a linked data structure in a computer system, the computer system including a processor, at least one cache memory, and a main memory, the method comprising:
traversing the linked data structure and visiting a first data node therein in search of requested data during execution of a process;
locating a storage location in a content addressable memory using a data node address of a second data node in the linked data structure which was visited prior to the first data node; and
storing a data node address of the first data node into the content addressable memory at the storage location associated with the second data node as a prefetch address for the first data node.

32. A program storage device readable by a machine, tangibly embodying a program of instructions executable by the machine to perform a method for prefetching data from a linked data structure within a memory subsystem of a computer system while searching for requested data in the linked data structure, the method comprising:
retrieving a prefetch address from a content addressable memory, the prefetch address pointing to a latter data node in the linked data structure, the latter data node being a specified number of data nodes beyond a current data node in the linked data structure;
prefetching data from the latter data node onto a cache memory of the memory subsystem;
storing an address of the current data node into the content addressable memory at a storage location associated with a data node which is the specified number of data nodes prior to the current data node within the linked data structure;
incrementing the latter data node to a next latter data node and incrementing the current data node to a next current data node;
fetching data from a data node being currently visited;
determining if the fetched data matches the requested data; and
iterating said retrieving, said prefetching, said storing, said incrementing, said fetching, and said determining until the fetched data matches the requested.

* * * * *

UNITED STATES PATENT AND TRADEMARK OFFICE
CERTIFICATE OF CORRECTION

PATENT NO. : 6,687,807 B1
DATED : February 3, 2004
INVENTOR(S) : Peter C. Damron It is certified that error appears in the above-identified patent and that said Letters Patent is hereby corrected as shown below:

Title page, Item [54] and Column 1, line 1,
Title, replace "METHOD FOR APPARATUS FOR PREFETCHING LINKED DATA STRUCTURES" with -- METHOD AND APPARATUS FOR PREFETCHING LINKED DATA STRUCTURES --.

Column 1,
Line 16, replace "modem" with -- modern --.

Column 3,
Line 8, replace "modem" with -- modern --.

Column 5,
Lines 34, 39, 42 and 43, replace "N3" with -- $N3$ --.
Lines 34, 37, 40 and 41, replace "N1" with -- $N1$ --.

Signed and Sealed this

Twenty-seventh Day of July, 2004

JON W. DUDAS
*Acting Director of the United States Patent and Trademark Office*